(12) United States Patent
Buragohain et al.

(10) Patent No.: US 8,719,069 B2
(45) Date of Patent: May 6, 2014

(54) METHOD AND APPARATUS FOR PROVIDING VIRTUAL MACHINE INFORMATION TO A NETWORK INTERFACE

(75) Inventors: Saumitra Buragohain, San Jose, CA (US); Sathish Kumar Gnanasekaran, Sunnyvale, CA (US); Dennis Hideo Makishima, Mountain View, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 445 days.

(21) Appl. No.: 12/838,624

(22) Filed: Jul. 19, 2010

(65) Prior Publication Data

US 2011/0173608 A1   Jul. 14, 2011

Related U.S. Application Data

(60) Provisional application No. 61/228,127, filed on Jul. 23, 2009.

(51) Int. Cl.
*G06Q 10/00* (2012.01)
(52) U.S. Cl.
USPC ........................................................ 705/7.21
(58) Field of Classification Search
USPC ........................................................ 705/7.21
See application file for complete search history.

(56) References Cited

U.S. PATENT DOCUMENTS

| | | | |
|---|---|---|---|
| 6,397,242 B1 * | 5/2002 | Devine et al. | 718/1 |
| 7,200,144 B2 * | 4/2007 | Terrell et al. | 370/389 |
| 7,478,173 B1 * | 1/2009 | Delco | 709/250 |
| 7,865,893 B1 * | 1/2011 | Omelyanchuk et al. | 718/1 |
| 7,921,431 B2 * | 4/2011 | Smart | 719/328 |
| 8,223,770 B2 | 7/2012 | Wray et al. | |
| 2006/0023707 A1 * | 2/2006 | Makishima et al. | 370/389 |
| 2008/0155208 A1 * | 6/2008 | Hiltgen et al. | 711/154 |
| 2011/0173609 A1 | 7/2011 | Buragohain et al. | |

OTHER PUBLICATIONS

Jibbe, M. K. Hammond-Doel, Tom; Wilson, Steven; "SNIA Tutorial—Fibre Channel Technologies: Current and Future". Oct. 29-31, 2007. Storage Networking Industry Association.*

* cited by examiner

*Primary Examiner* — Romain Jeanty
(74) *Attorney, Agent, or Firm* — Wong, Cabello, Lutsch, Rutherford & Brucculeri, L.L.P.

(57) ABSTRACT

A hypervisor preferably provides VM identification, priority and LUN/LBA range information to the HBA when a VM is created. Alternatively, the HBA can determine that a LUN/LBA range is new and request VM identity, priority and LUN/LBA range from the hypervisor. The HBA creates a table containing the VM identification, priority and LUN/LBA range. The HBA then detects operations directed to the LUN/LBA range and does a lookup to determine VM identification and priority. VM identification and priority are then mapped into a field in a frame using a unique identifier. The unique identifier can either be placed using reserved bits on the existing Fiber Channel (FC) header or can use bits in an additional header, such as a modified IFR header.

24 Claims, 10 Drawing Sheets

| Bit Word | 31 .. 24 | 23 .. 16 | 15 .. 08 | 07 .. 00 |
|---|---|---|---|---|
| 0 | R_CTL | D_ID | | |
| 1 | CS_CTL | S_ID | | |
| 2 | TYPE | F_CTL | | |
| 3 | SEQ_ID | DF_CTL | SEQ_CNT | |
| 4 | OX_ID | RX_ID | | |
| 5 | Parameter | | | |

| Bits | Abbr. | Meaning |
|---|---|---|
| 31 | PREF | 0=No Preference 1=With Preference |
| 30 | | Reserved |
| 29-24 | DSCP | Differentiated Services Code Point |

Fig. 6

METHOD AND APPARATUS FOR PROVIDING VIRTUAL MACHINE INFORMATION TO A NETWORK INTERFACE

CROSS REFERENCE TO RELATED APPLICATIONS

This application claims the benefit under 35 U.S.C. §119 (e) of U.S. Provisional Patent Application Ser. No. 61/228,127 entitled "Virtual Machine Identification in Packets Transmitted over a Network," filed Jul. 23, 2009, which is hereby incorporated by reference.

This application is related to U.S. patent application Ser. No. 12/838,627, entitled "Method and Apparatus for Determining the Identity of a Virtual Machine," filed concurrently herewith and by the same inventors, which is hereby incorporated by reference.

BACKGROUND OF THE INVENTION

1. Field of the Invention

The present invention relates generally to storage area networks. Particularly, the present invention relates to operation of storage area networks with attached hosts running virtualization software and having a plurality of virtual machines.

2. Description of the Related Art

Virtual machines (VMs) are being used in increasing numbers in networks. They are advantageous because they maximize the use of the hardware resources in the network, particularly the host or server hardware. However, the use of virtual machines presents problems when the host machine is connected to a storage area network (SAN). For a number of reasons it is desirable to have visibility of the particular virtual machines in the various hosts on the SAN. These reasons include simplified management through the use of a single management tool, cost back charging relating to resource use and improved quality of service (QoS) or prioritization of the communications for given VMs.

Current VM hypervisors do not readily provide this capability. For example, in VMware, the VMs can be separately identified on the SAN if they use the NPIV features provided by the host bus adaptors (HBAs). But to use NPIV, the VM must be setup to use raw device mapping (RDM) of the hypervisor. This results in management difficulties in both the hypervisor and on the SAN. On the SAN, zoning becomes very complicated as each VM must be operated on individually. Similarly, SAN QoS is also more difficult to manage because of the individual nature of the VMs and their NPIV addresses.

VMware ESX, the prevalent hypervisor, provides an alternate technique referred to as VMFS or virtual machine file system. It is much easier to administer VMs when VMFS is used, so the majority of server administrators would prefer to utilize VMFS. But VMFS does not allow identification on the SAN of the individual VMs. Currently NPIV cannot be used, even with its attendant SAN management issues. So the inability to manage, charge back and so on has limited the use of hypervisors using VMFS operation on the SAN.

Similar issues are present with Hyper-V from Microsoft and its clustered shared volume (CSV) file system and XenServer from Citrix with the Control Domain and Storage Repositories.

As VMFS or CSV, depending on the hypervisor, is the greatly preferred technique for providing storage resources in a hypervisor, it would be desirable to be able to better operate with VMFS or CSV-based systems on a SAN.

SUMMARY OF THE INVENTION

According the embodiments of the present invention, the hypervisor preferably provides VM identification, priority and LUN/LBA range information to the HBA or network interface when a VM is created and provides VM identification at the beginning of each new command. Alternatively, the HBA or network interface can determine that a VM or LUN/LBA range is new and request VM identity, priority and LUN/LBA range from the hypervisor. The HBA creates a table containing the VM identification, priority and LUN/LBA range. The HBA then detects operations directed to the VM or LUN/LBA range and does a lookup to determine priority. VM identification and priority are then mapped into a field in a frame using a unique identifier. The unique identifier can either be placed using reserved bits on the existing Fibre Channel (FC) header or can use bits in an additional header, such as a modified IFR header. With the unique identifier in the frame, fabric wide handling of the frames for QoS is greatly simplified as the unique identifier can be directly mapped to SLAs and priority levels. Additionally, statistics based on the frames can also readily be developed based on particular VMs to allow greatly improved chargeback mechanisms and the like. Further, the presence of the unique identifier allows improved management of the SAN as operations can be traced back directly to individual VMs, not just physical hosts, for operations such as zoning and access control The unique identifier can also be used in the storage devices. One particular use is to incorporate the VM instance into the caching algorithm, with per VM caching, not just per host caching.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 6 is a diagram of a Fibre Channel packet header according to one embodiment of the present invention.

DETAILED DESCRIPTION OF THE PREFERRED EMBODIMENTS

Figure 1:
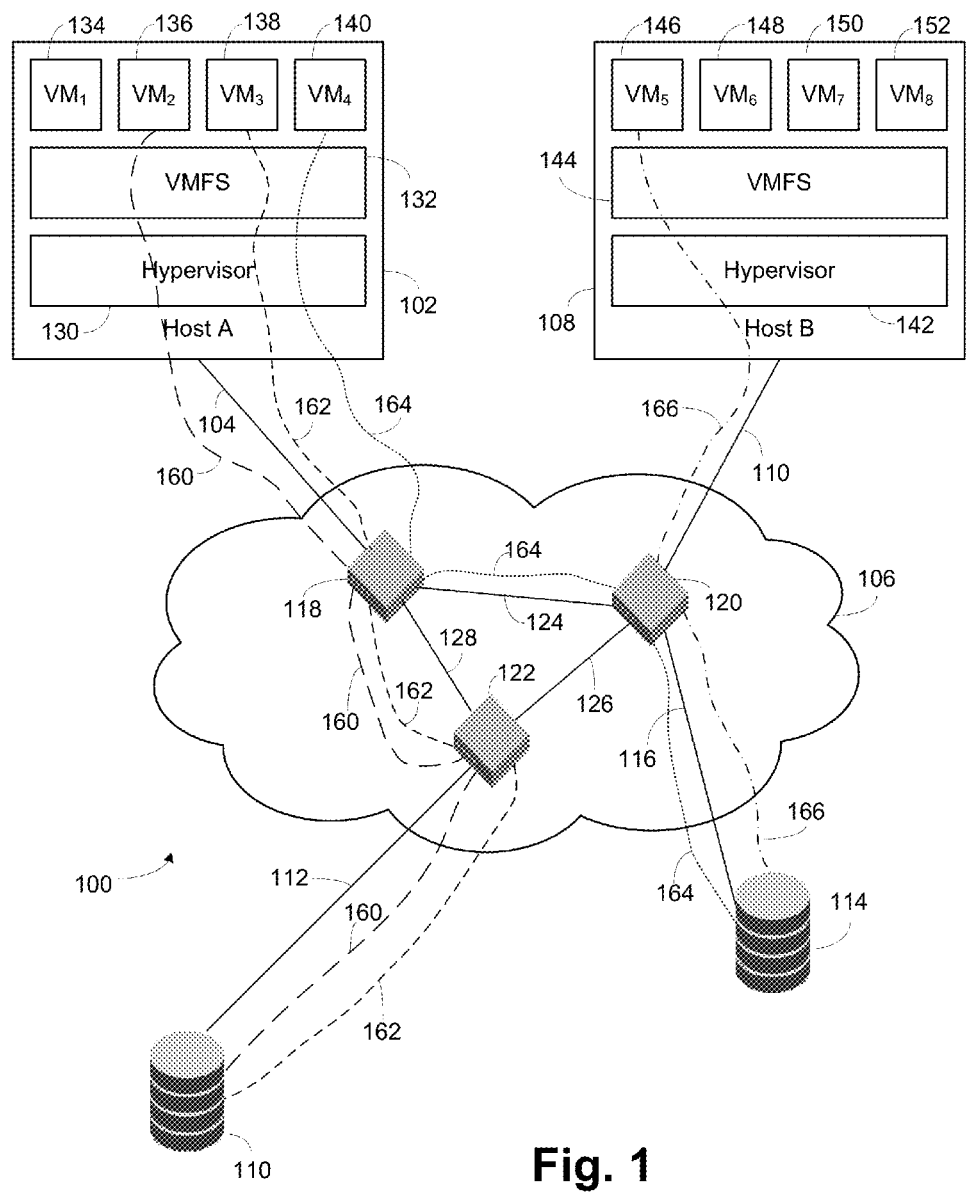
FIG. 1 illustrates a storage area network with various connected virtual machines and storage units according to an embodiment of the present invention.

FIG. 1 illustrates a block diagram of a storage area network (SAN) 100. A host 102 is connected by a link 104 to a network 106. Similarly a host 108 is connected by a link 110 to the fabric 106. A storage unit 110 is connected by a link 112 to the fabric 106, while a storage unit 114 is connected by a link 116 to the fabric 106. A series of three switches 118, 120, 122 form the illustrated fabric 106. The link 104 is connected to switch 118, the link 110 is connected to switch 120, the link 112 is connected to switch 122 and the link 116 is connected to switch 120. Each of the switches 118, 120, 122 are interconnected by links 124, 126 and 128.

The host 102 includes a hypervisor 130 which executes a virtual machine file system (VMFS) 132. A series of virtual machines in $VM_1$-$VM_4$ 134-140 execute on top of the VMFS 132. Similarly the host 108 includes a hypervisor 142, a VMFS 144 and virtual machines $VM_5$-$VM_8$ 146-152.

Illustrated in FIG. 1 is a path 160 from $VM_2$ 136 to storage unit 110. This path 160, indicated by the long dashed line, traverses the VMFS 132 to the hypervisor 130, the link 104, the switch 118, the link 128, the switch 122 and the link 112. $VM_3$ 138 has a similar path 162 to storage unit 110. $VM_4$ 140 has a path 164 which traverses the VMFS 132, the hypervisor 130, the link 140, the switch 118, the link 124, the switch 120 and the link 116 to reach storage unit 114. The $VM_5$ 146 has a path 166 which traverses the VMFS 144, the hypervisor 142, the link 110, the switch 120 and the link 116 to the storage unit 114.

Packets or frames, the terms being used synonymously in this description, of $VM_2$ 136 and $VM_3$ 138 travel identical routes to the storage unit 110, so it is very difficult to determine which packets were related to which path and therefore it is very difficult to prioritize the two sets of packets differently. $VM_4$ 140 in the host 102 and $VM_5$ 146 in the host 108 use different routes to contact storage unit 114 and would have different source addresses, but if $VM_4$ 140 were transferred to host 108 using VMotion, then the paths would align and the same difficulty would appear as with $VM_2$ 136 and $VM_3$ 138.

Figure 2A:
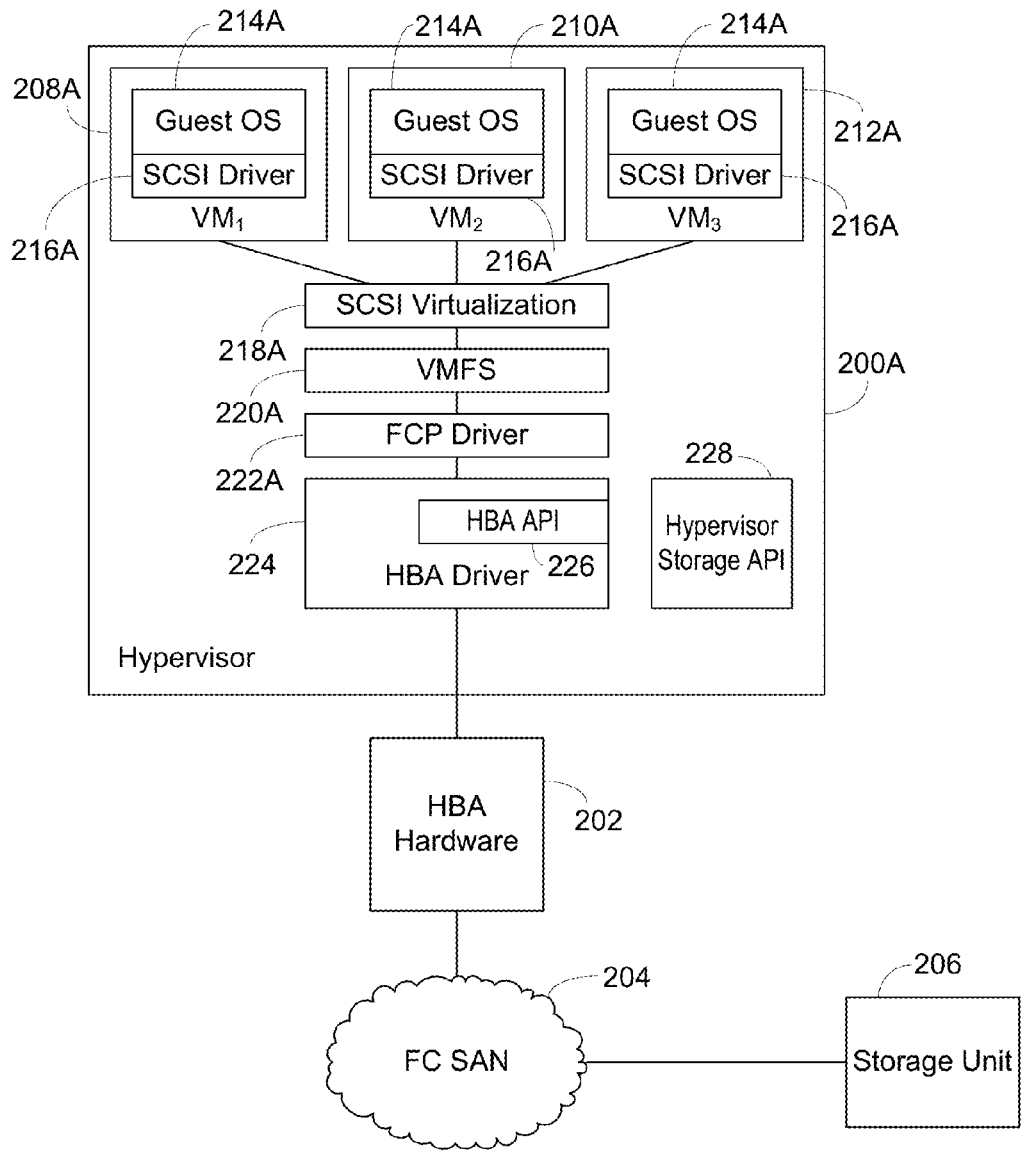
FIG. 2A illustrates a software stack for use with an HBA according to an embodiment of the present invention, with connection to an FC SAN and a storage unit included.

FIG. 2A illustrates the software stack of a host 200A executing a hypervisor, such as VMware $ESX_2$ which is connected to host bus adapter (HBA) hardware 202, the hardware portion of the exemplary network interface, which in turn is connected to a Fibre Channel (FC) SAN 204, which is also connected to a storage unit 206. The host 200A includes the VM 208A, $VM_2$ 210A and $VM_3$ 212A. Each virtual machine 208A, 210A and 212A includes a guest operating system (OS) 214A and a SCSI driver 216A. The SCSI driver 216A is connected to a SCSI virtualization layer 218A provided by the hypervisor present in the host 200A. The SCSI virtualization layer 218A is connected to the VMFS 220A, which is the virtualization storage layer. The VMFS 220A is connected to an FCP driver 222A to convert the SCSI commands to the FC FCP commands. The FCP driver 222A is connected to an HBA driver 224, the software portion of the exemplary network interface, which is also connected to the HBA hardware 202. The HBA driver 224 receives the FCP packets and blocks from the FCP driver 222A and interacts with the HBA hardware 202 to provide packets to the FC San 204 for delivery to the storage unit 206. The HBA driver 224 includes an HBA API 226, while the hypervisor provides a hypervisor storage API 228.

Figure 2B:
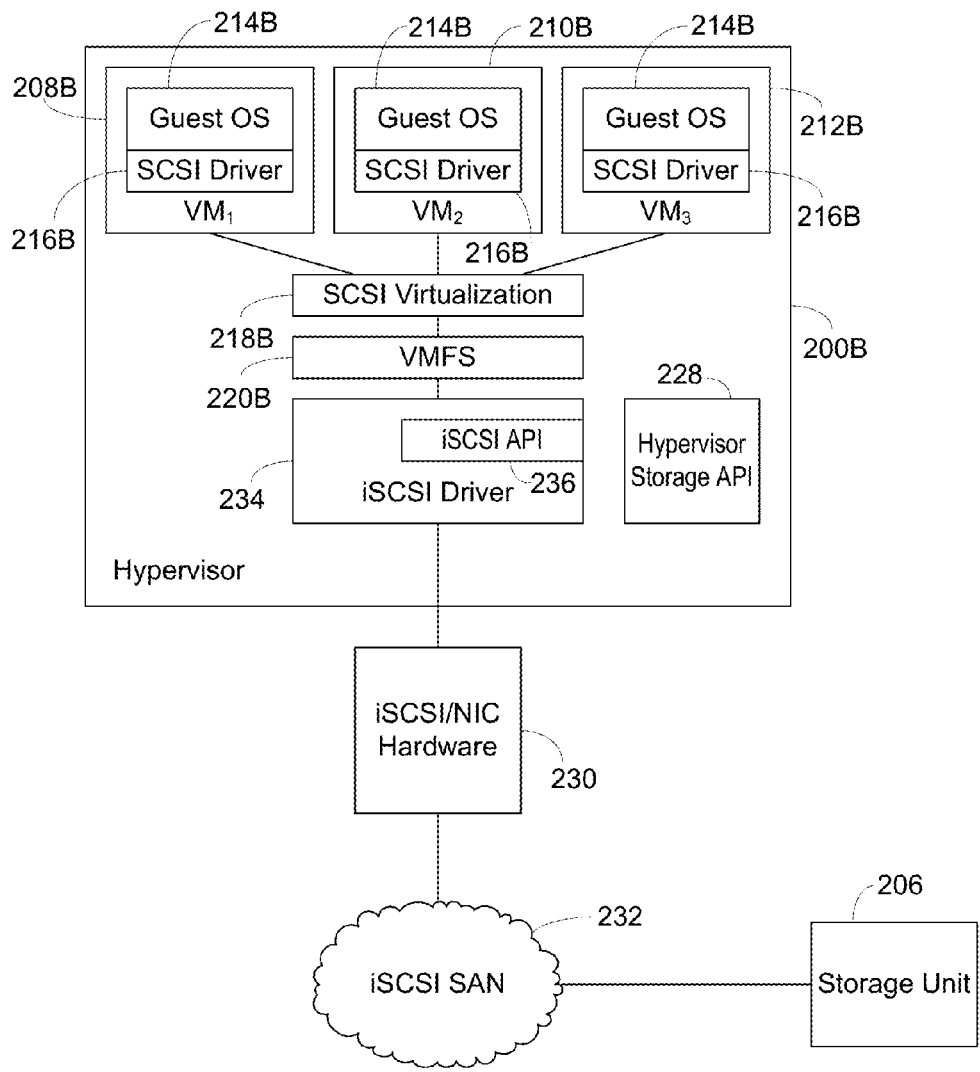
FIG. 2B illustrates a software stack for use with an iSCSI or Ethernet network interface card according to an embodiment of the present invention, with connection to an iSCSI SAN and a storage unit included.

In FIG. 2B a host 200B executing a hypervisor which is operating with an SCSI/network interface card (NIC) hardware 230, which in turn is connected to an iSCSI SAN 232, which is connected to the storage unit 206. Elements and items similar to those shown in FIG. 2A receive the same numbering with the addition of the letter B. Thus VMFS 220B is connected to an iSCSI driver 234. The iSCSI driver 234 includes an iSCSI API 236 which operates similarly to the HBA API 226.

Figure 2C:
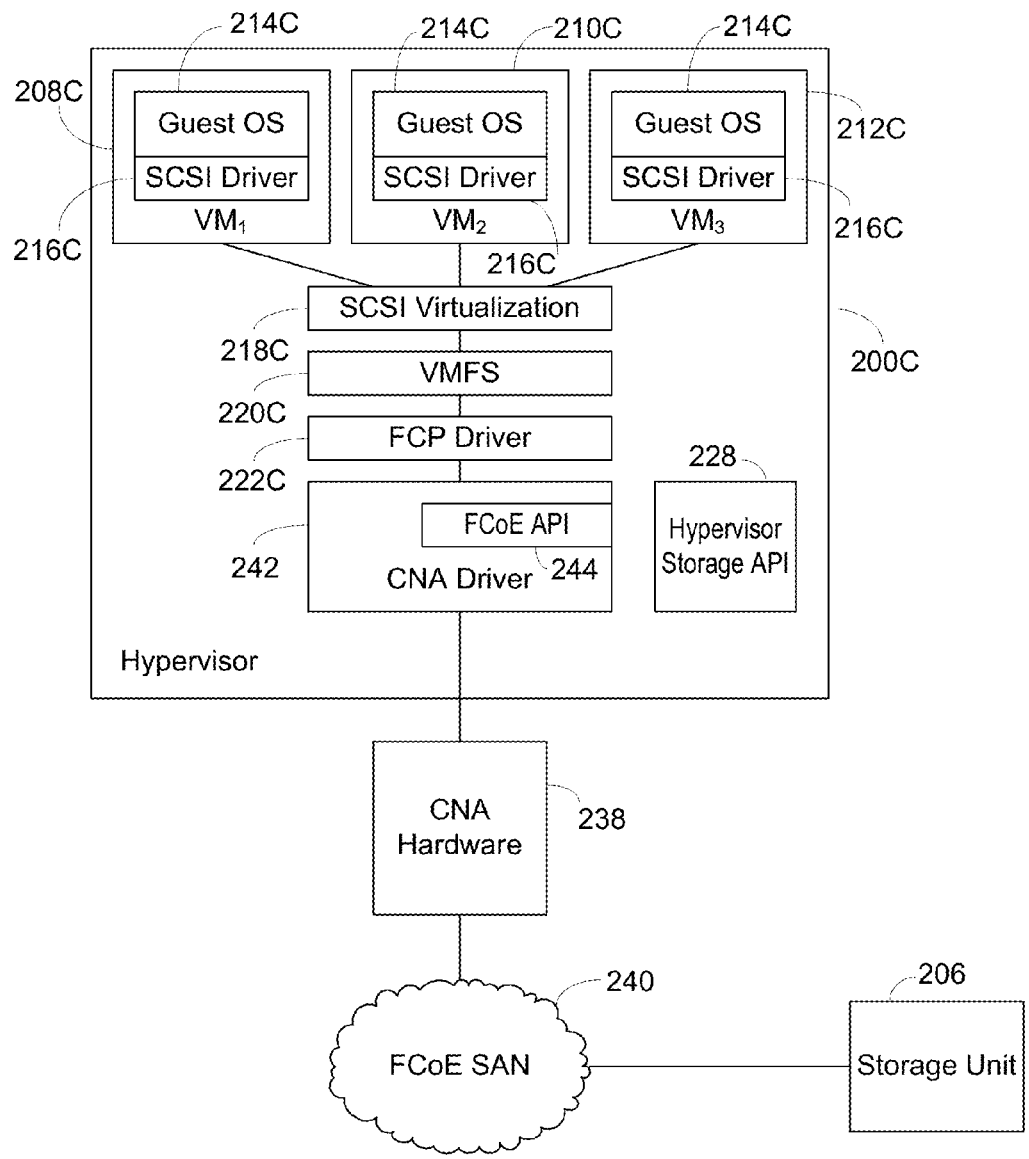
FIG. 2C illustrates a software stack for use with an FCoE converged network adaptor according to an embodiment of the present invention, with connection to an FCoE SAN and a storage unit included.

In FIG. 2C a host 200C executing a hypervisor is connected to converged network adapter (CNA) hardware 238, which is connected to a Fibre Channel over Ethernet (FCoE) SAN 240, which is connected to the storage unit 206. Similar elements in FIG. 2C to those of FIG. 2A are numbered similarly and end with the letter C. The VMFS layer 220C is connected to an FCP driver 222C, with the FCP driver 222C connected to a CNA driver 242. The CNA driver 242 is connected to the CNA hardware 238. The CNA driver 244 includes an FCoE API 244 which operates similarly to the HBA API 226.

Figure 3:
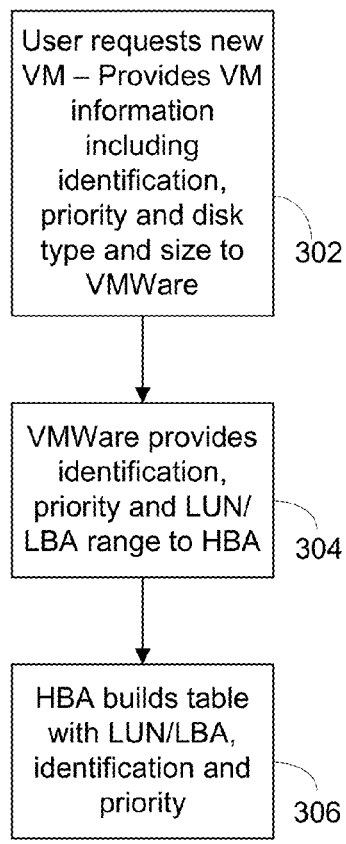
FIG. 3 illustrates a flowchart of operations when a VM is created according to an embodiment the present invention.

FIG. 3 illustrates a flowchart for obtaining desired VM information when the VM is created. In step 302 a user or administrator requests a new VM be set up according to the techniques for the particular hypervisor. This description will focus on VMware ESX, but it is understand that other hypervisors, such as Microsoft Hyper-V and the like, can replace ESX. The hypervisor requests various information from the user to set up the VM, such as identification, priority, disk type and disk size. For ESX, the disk type can be RDM or VMFS. Of importance in this description is the use of VMFS as the disk type, for reasons discussed above. For Hyper-V the equivalent is CSV. The identification can be a single value representing just the particular VM or can be multiple values, such as a group value and an individual value. The use of a group value allows management of a plurality of VMs directly as a group, without the need to combine VMs with a management tool. The priority can be a value such as high, medium or low. ESX then provides the identification, priority and LUN/LBA range to the HBA driver 224 for the particular HBA 202 using the HBA API 226. The HBA driver 224 then loads this information into a table. The table forms the basis for detection of the particular VM in commands provided to the HBA 202 and includes other values such as S_ID and D_ID of the various relevant units.

Figure 4:
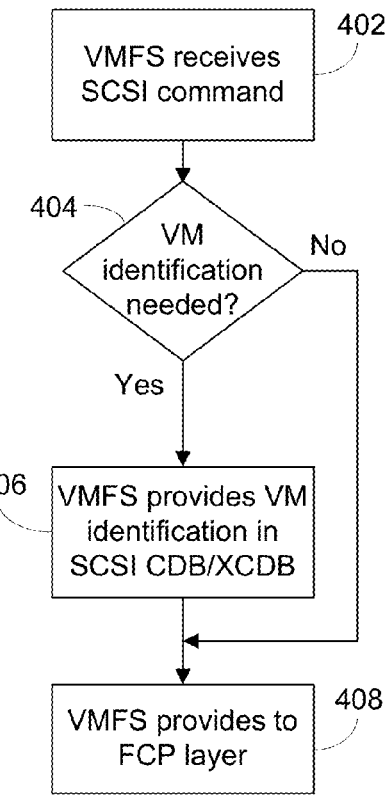
FIG. 4 illustrates storage software operations when a new SCSI command is received according to an embodiment of the present invention.

In FIG. 4 at step 402 the VMFS 220A receives a SCSI command provided from the guest operating system 214A through the SCSI driver 216A and the SCSI virtualization layer 218A. In step 404 the VMFS 220A determines if virtual machine identification is needed to be provided in the SCSI command. If so, control proceeds to step 406 where the VMFS 220A places VM identification values in either the SCSI CDB or an extended CDB. If no identification is needed or used, as done in selected embodiments, or after the VM identification has been provided in step 406, control proceeds to step 408 where the VMFS 220A provides the SCSI CDB to the FCP driver 222A.

Figure 5:
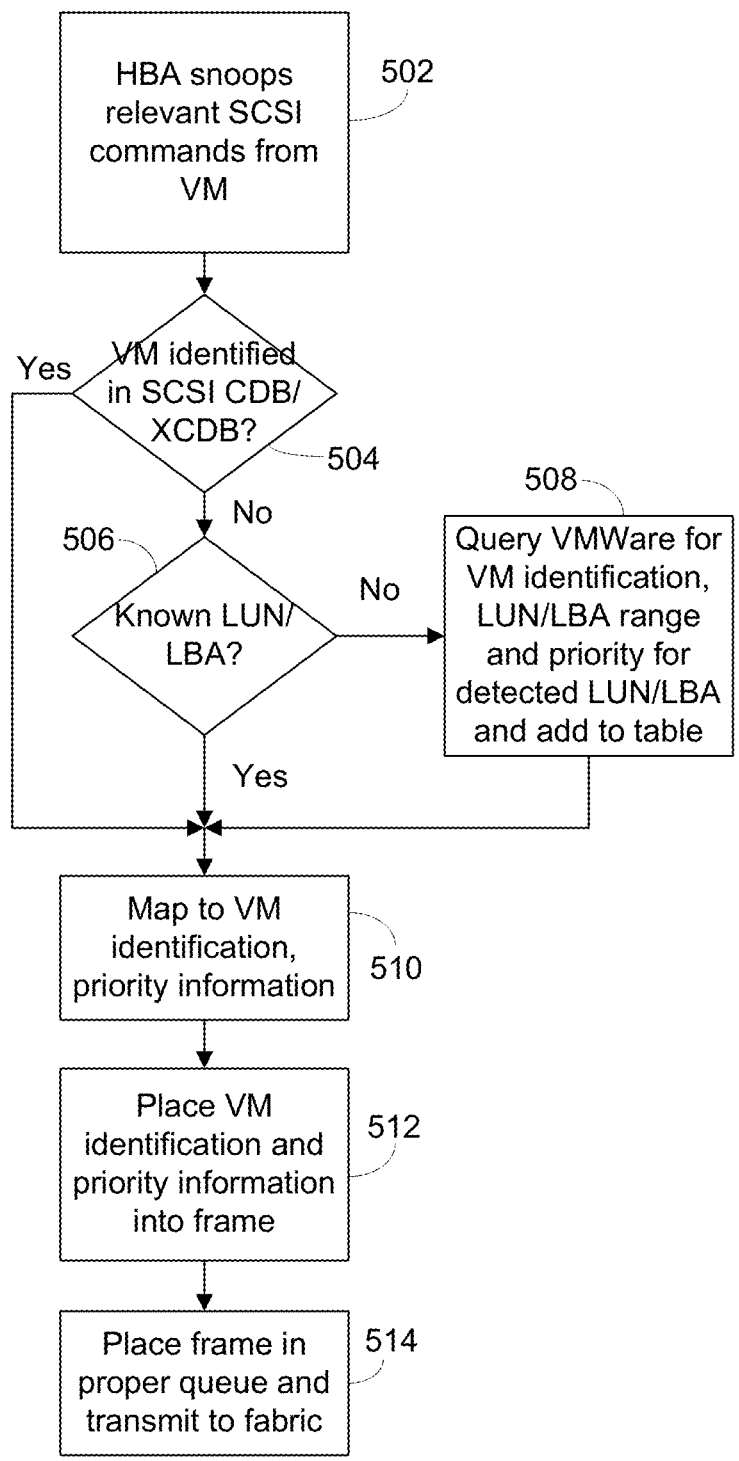
FIG. 5 illustrates a flowchart of HBA operations according to an embodiment of the present invention.
Figure 7:
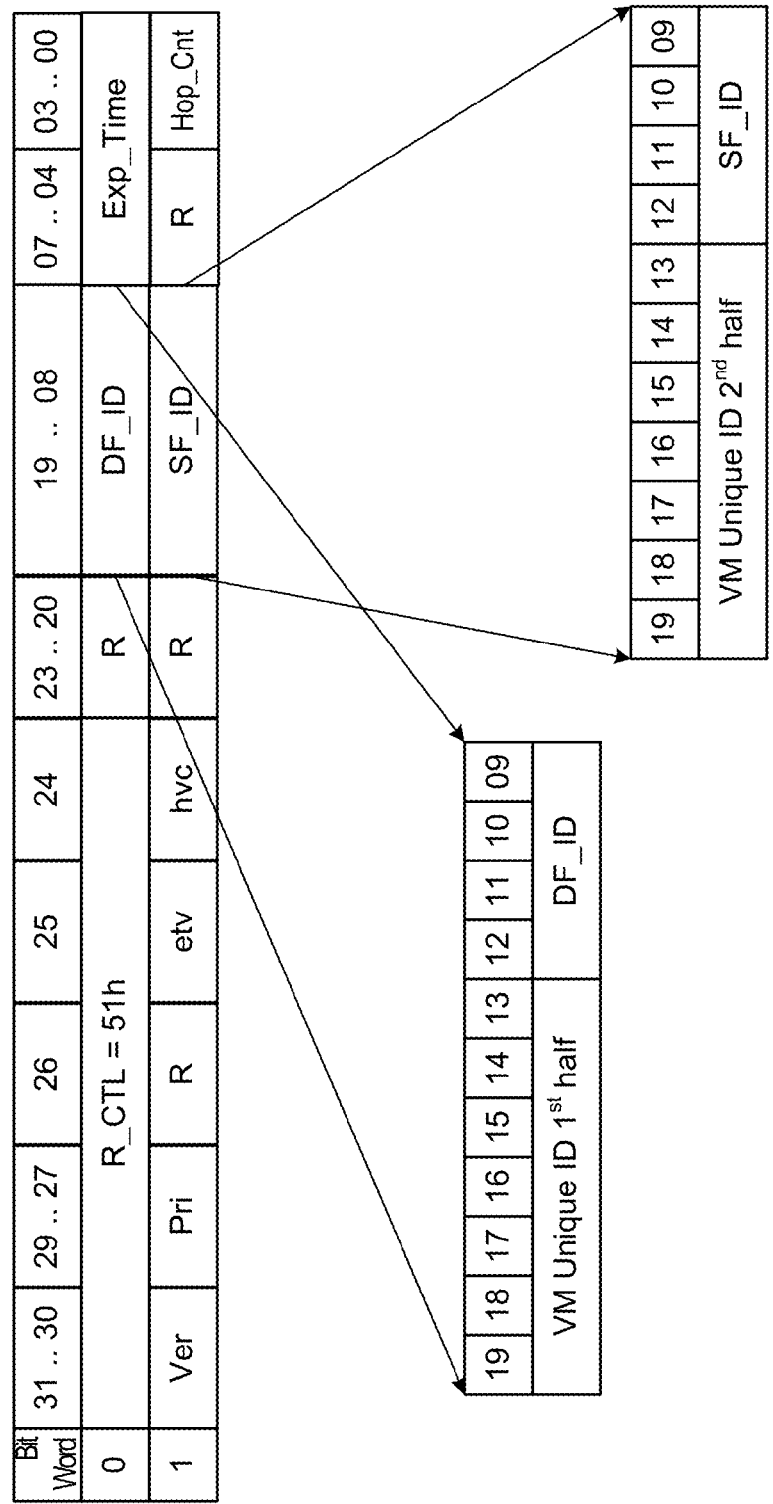
FIG. 7 is a diagram of a Fibre Channel packet header according to one embodiment of the present invention.

FIG. 5 illustrates a flowchart of the HBA 202 determining the VM for a particular frame and then loading a unique identifier into the frame for use in the remainder of the fabric. In step 502 the HBA 202 snoops the received command, typically an FCP command, for the command type, VM identification value, LUN and LBA range. In step 504 the HBA 202 compares any detected VM identification information to the table built using step 306. If there is a miss, indicating either a new VM or that the VMFS 220 has not added VM identifiable values, as can be the case in selected embodiments, control proceeds to step 506 to compare the LUN and LBA values to the table. If there is a miss, indicating a new LUN/LBA, this is an indication that a new VM needs to be included in the table. In that case, in step 508 the HBA driver 224 queries the ESX through the hypervisor storage API 228 to obtain the VM identification, priority and LUN/LBA range. The returned values are loaded into the table. This operation can be done in parallel with dropping or rejecting the received command to allow time to do the query and set up the table entry. This will not be a significant performance delay because the first command will typically be a command such as an inquiry, a command which has a longer response time, thus reducing the practical performance degradation. Further, it will only have to be done once per VM, as the table entry will be used in all later operations. If the VM was identified, the LUN/LBA are known or after step 508, in step 510 the table is used to map to a unique identifier and the priority information developed for this particular VM. In step 512 that unique identifier and any additional priority information are placed into the frame built using the received FCP command. In one embodiment the unique identifier is placed in reserved bits in the CS_CTL field of the FC header, as shown in FIG. 6. However, this is a limited number of bits, so the number of unique identifiers is smaller than generally desired. This embodiment does have the advantage of not adding any bits or headers to frames. In a second embodiment a modified IFR or interfabric router header as defined in the FC_IFR specification is pre-pended to the frame, as shown in FIG. 7. As the IFR header is a standard frame header, processing is currently being done with those headers. One option is to combine the unique identifier and the fabric ID in a fabric ID field, SF_ID or DF_ID or both fabric ID fields. This will allow significantly more bits to be available for the unique identifier as the fabric ID values are usually only a limited number of bits. If necessary, a new R_CTL value, such as 53h, can be used to identify the frame. Other variations can also be used. In step 514 the frame is placed in the proper queue in the HBA 202 and transmitted to the fabric 204. Preferably the HBA 202 includes various queues used for QoS reasons, so the frame can be processed and handled correctly from the beginning.

Return frames from the storage unit 206 can be developed at least two different ways. First, the storage unit 206 can include an HBA similar to HBA 202 in that it can provide the unique identifier in any return frames. The storage unit HBA stores the unique identifier information in its context tables and builds the proper frame structure to allow the inclusion of the unique identifier. Second, if the storage unit cannot provide the unique identifier, the switches that form the FC SAN 204 can monitor for return frames having a D_ID and OXID that match the S_ID and OXID of the frames that included the unique identifier. Upon detecting the D_ID and OXID match for a frame that does not include the unique identifier, the switch can then reformat the frame to include the unique identifier. This allows the various operations to be done on both flow directions.

An alternative to the HBA 202 doing the command snooping and the placement of the unique identifier in the frame is to have the snooping and unique identifier insertion done by the switch connected to the HBA 202. The switch needs to receive the VM identification, priority and LUN/LBA range to allow the snooping of received frames. The snooping is much like that done by the HBA 202 in step 502 except that it is done on the normal frames provided by the HBA 202. In one variation the VM identification, priority and LUN/LBA range are provided from the HBA 202 to the switch in command packets, so that the HBA 202 retains the interface with the VM. In this case the switch will also communicate with the HBA 202 to request the VM identification, priority and LUN/LBA range for frames that miss the table in the switch. The HBA 202 will do the query described above and provide the information to the switch. This variation minimizes the work being performed in the HBA 202 to just the simple interfaces with the VM and leaves the snooping and frame development to the more powerful switch. A second variation has the hypervisor providing the VM identification, priority and LUN/LBA range directly to the switch. In this variation the APIs are effectively between the switch and the hypervisor, not the HBA 202 and the VMFS. This is less desirable as new commands and the like have to be developed for both the hypervisor and the switches. A third variation has the hypervisor and the switch cooperating with a management entity, which effectively has the APIs shown in the HBA of FIG. 2A. This is simpler than the second variation as the interfaces will be more easily developed, but will require the constant operation of the management entity.

The frame provided to the fabric includes the unique identifier of the VM. The various devices in the fabric can examine the frame to determine the unique identifier and use that as an entry into tables which define the priority and handling of the frame. This information is provided across the fabric using a management tool which can select a VM from the information present in the HBA 202 and then propagate necessary priority and handling information appropriate for each device in the fabric to those devices. Thus the user or administrator need only use one management tool to track the VM through the SAN 204 and then obtain desired information, such as traffic information used for charging back to the proper department. The management tool will also be able to simply define the SLA of the VM and set the priority and handling of the frames across the fabric accordingly. And it is noted that all of this is done with the hypervisor using a file system such as VMFS which does not readily provide information about the VMs to the HBA. It is also noted that no changes need to be made to modules such as VMFS. The minimal operation uses an API from the HBA driver 224 back into the hypervisor via the hypervisor storage API 228, with the preferred operation also including the hypervisor proactively providing VM information to the HBA driver 224 on VM creation or modification.

Figure 8:
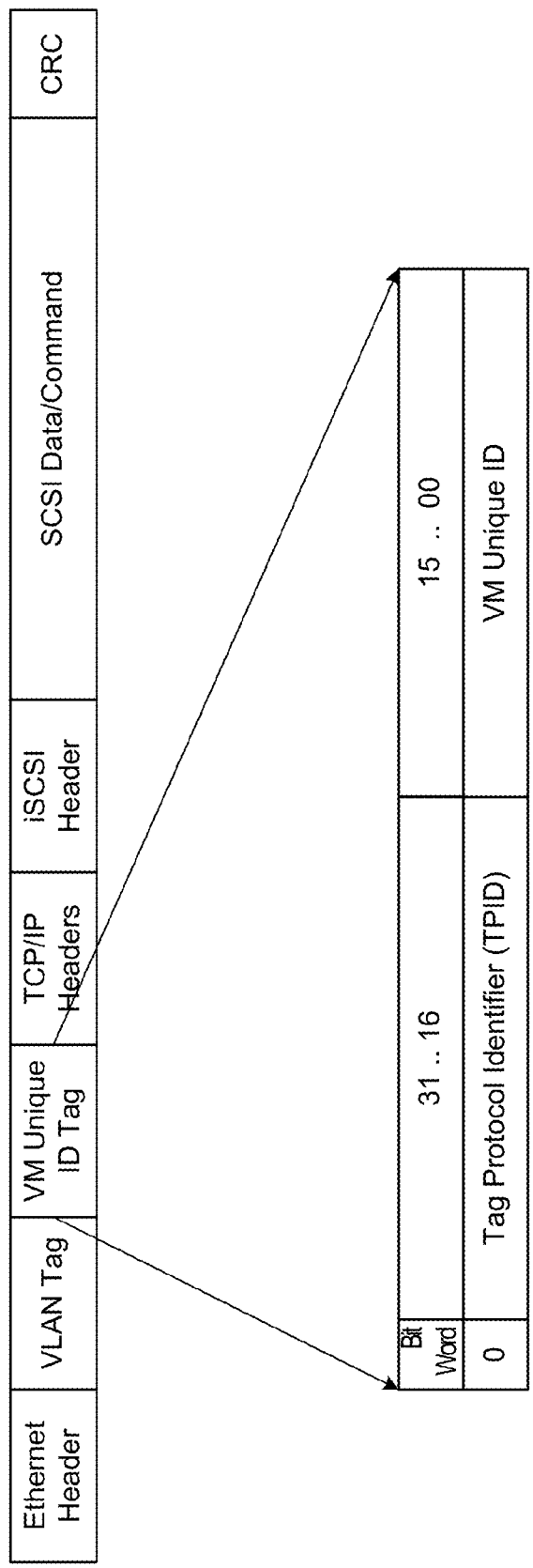
FIG. 8 is a diagram of an iSCSI packet according to one embodiment of the present invention.
Figure 9:
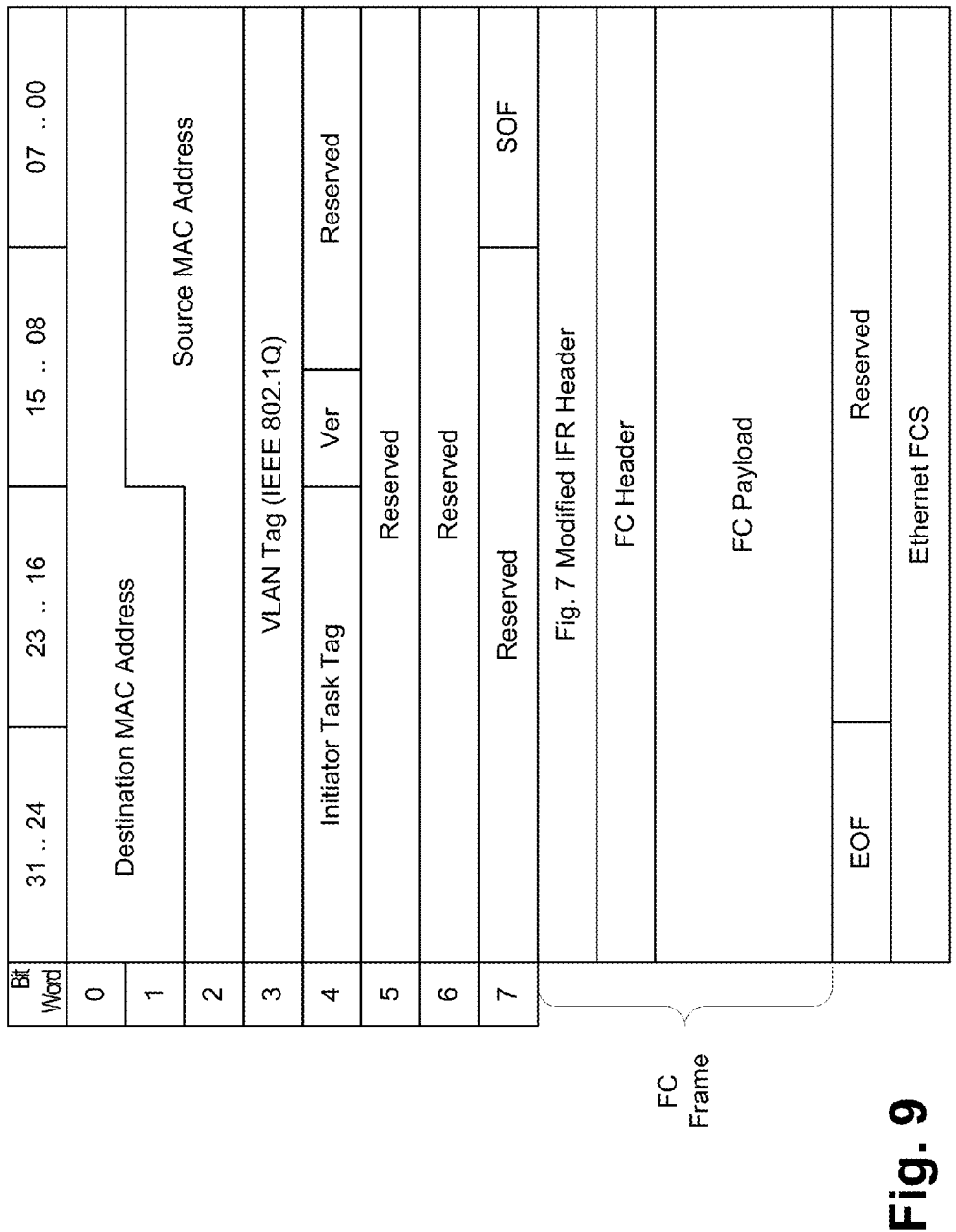
FIG. 9 is a diagram of an FCoE packet according to one embodiment of the present invention.

While the above description has focused on operations using the FC HBA 202, similar operations occur with iSCSI and FCoE variations, with the iSCSI driver 234 and iSCSI/NIC hardware 230 or CNA driver 242 and CNA hardware 238 being substituted for the HBA driver 224 and HBA hardware 202. Similarly, switch operations for the embodiments would be done by the Ethernet switches forming the iSCSI SAN 232 or FCoE SAN 240. In iSCSI frames, the unique identifier can be placed in a new tag similar to a VLAN tag as shown in FIG. 8, or at some possible location in the frame. In FCoE frames, the unique identifier can be placed in the FC frame as described above as shown in FIG. 9.

Various fabric level operations can be performed using the unique identification value representing the VM provided in the frames. These include quality of service (QoS); encryption and/or compression by VM; zoning; access control; migration of VMs between hosts in the same or different data centers, fabrics or network clouds (and other VMotion aspects); improved statistics by VM and federated management of the SAN.

The following U.S. patents or applications are incorporated by reference to provide further details relating to QoS usage of the VMs: U.S. Pat. No. 7,239,641, entitled "QUALITY OF SERVICE USING VIRTUAL CHANNEL TRANS- LATION; U.S. Pat. No. 7,426,561, entitled CONFIGURABLE ASSIGNMENTS OF WEIGHTS FOR EFFICIENT NETWORK ROUTING"; Ser. No. 11/782,894 filed Jul. 25, 2007, entitled "METHOD AND APPARATUS FOR DETERMINING BANDWIDTH-CONSUMING FRAME FLOWS IN A NETWORK;" Ser. No. 11/674,637, filed Feb. 13, 2007, entitled "QUALITY OF SERVICE USING VIRTUAL CHANNEL TRANSLATION;" Ser. No. 12/119,440, filed May 12, 2008, entitled "AUTOMATIC ADJUSTMENT OF LOGICAL CHANNELS IN A FIBRE CHANNEL NETWORK;" Ser. No. 12/119,436, filed May 12, 2008, entitled "METHOD AND SYSTEM FOR FACILITATING APPLICATION-ORIENTED QUALITY OF SERVICE IN A FIBRE CHANNEL NETWORK;" Ser. No. 12/119,448, filed May 12, 2008, entitled "METHOD AND SYSTEM FOR CONGESTION MANAGEMENT IN A FIBRE CHANNEL NETWORK;" Ser. No. 12/119,457, filed May 12, 2008, entitled "WORKLOAD MANAGEMENT WITH NETWORK DYNAMICS;" and Ser. No. 12/119,430, filed May 12, 2008, entitled "METHOD AND SYSTEM FOR FACILITATING QUALITY OF SERVICE IN EDGE DEVICES IN A FIBRE CHANNEL NETWORK."

The following U.S. patent is incorporated by reference to provide further details relating to encryption and/or compression usage of the VMs: U.S. Pat. No. 7,533,256, entitled "METHOD AND APPARATUS FOR ENCRYPTION OF DATA ON STORAGE UNITS USING DEVICES INSIDE A STORAGE AREA NETWORK FABRIC."

The following U.S. patents or applications are incorporated by reference to provide further details relating to zoning usage of the VMs: U.S. Pat. No. 7,366,194, entitled "FIBRE CHANNEL ZONING BY LOGICAL UNIT NUMBER IN HARDWARE" and U.S. Pat. No. 7,352,740, entitled "EXTENT-BASED FIBRE CHANNEL ZONING IN HARDWARE."

The following U.S. application is incorporated by reference to provide further details relating to migration and VMotion usage of the VMs: Ser. No. 10/356,659, filed, Jan. 31, 2003, entitled "METHOD AND APPARATUS FOR PROVIDING VIRTUAL PORTS WITH ATTACHED VIRTUAL DEVICES IN A STORAGE AREA NETWORK."

The knowledge of the VMs provided in the frames can also be used by the storage devices connected to the fabric. One common operation in a storage device is caching of data. By detecting the VMs based on the unique identifier in the frames, the caching algorithm employed in the storage unit can be improved by breaking down to the VM level, rather than the S_ID or host address level as down today. A combination of caching algorithms could be used, some by address and some by VM. The details of the caching could also be varied between VMs based on priority values.

As discussed, VMware ESX is used as the described embodiment but various other hypervisors can be used, such as Microsoft's Hyper-V with CSV, other variations of VMware products and other vendor products. Further, the preferred embodiment was discussed based on a FC SAN environment. Other SANs, such as iSCSI and FCoE can also be used, alone or in combinations as illustrated in FIGS. 2B and 2C, with appropriate changes to FIGS. 3, 4 and 5.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. An apparatus comprising:
a host computer;
a network interface connected to the host computer and for coupling to a network; and
a hypervisor executing on the host computer,
wherein the hypervisor:
  determines virtual machine (VM) information when a VM is created; and
  provides the VM information to the network interface when the VM information is determined,
wherein network interface includes a driver which includes a driver application programming interface (API) and the hypervisor provides the VM information to the driver API of the network interface,
wherein the network interface incorporates a unique identifier based on the VM information into outgoing frames to allow the frames to be identified with the VM throughout the network.

2. The apparatus of claim 1, wherein the network is a storage area network (SAN).

3. The apparatus of claim 2, wherein the SAN is an iSCSI SAN.

4. The apparatus of claim 2, wherein the SAN is a Fibre Channel over Ethernet (FCoE) SAN.

5. The apparatus of claim 2, wherein the SAN is a Fibre Channel SAN.

6. The apparatus of claim 5, wherein the network interface is a host bus adaptor (HBA).

7. The apparatus of claim 6, wherein the unique identifier is provided in the CS_CTL field of the Fibre Channel frame header.

8. The apparatus of claim 6, wherein the unique identifier is provided in a fabric identification field of a Fibre Channel frame header.

9. A method comprising:
determining, by a hypervisor, virtual machine (VM) information when a VM is created; and
providing, by the hypervisor, the VM information to a network interface, the network interface for coupling to a network, when the VM information is determined, wherein the hypervisor provides the VM information to a driver application programming interface (API) of the network interface, and
incorporating, by the network interface, a unique identifier based on the VM information into outgoing frames to allow the frames to be identified with the VM throughout the network.

10. The method of claim 9, wherein the network is a storage area network (SAN).

11. The method of claim 10, wherein the SAN is an iSCSI SAN.

12. The method of claim 10, wherein the SAN is a Fibre Channel over Ethernet (FCoE) SAN.

13. The method of claim 10, wherein the SAN is a Fibre Channel SAN.

14. The method of claim 13, wherein the network interface is a host bus adaptor (HBA).

15. The method of claim 14, wherein the unique identifier is provided in the CS_CTL field of the Fibre Channel frame header.

16. The method of claim 14, wherein the unique identifier is provided in a fabric identification field of a Fibre Channel frame header.

17. A non-transitory computer readable medium or media storing instructions executed by a processor or processors to perform a method, the method comprising:

determining, by a hypervisor, virtual machine (VM) information when a VM is created; and providing, by the hypervisor, the VM information to a network interface, the network interface for coupling to a network, when the VM information is determined, wherein the hypervisor provides the VM information to a driver application programming interface (API) of the network interface, and incorporating, by the network interface, a unique identifier based on the VM information into outgoing frames to allow the frames to be identified with the VM throughout the network.

18. The non-transitory computer readable medium or media of claim 17, wherein the network is a storage area network (SAN).

19. The non-transitory computer readable medium or media of claim 18, wherein the SAN is an iSCSI SAN.

20. The non-transitory computer readable medium or media of claim 18, wherein the SAN is a Fibre Channel over Ethernet (FCoE) SAN.

21. The non-transitory computer readable medium or media of claim 18, wherein the SAN is a Fibre Channel SAN.

22. The non-transitory computer readable medium or media of claim 21, wherein the network interface is a host bus adaptor (HBA).

23. The non-transitory computer readable medium or media of claim 22, wherein the unique identifier is provided in the CS_CTL field of the Fibre Channel frame header.

24. The non-transitory computer readable medium or media of claim 22, wherein the unique identifier is provided in a fabric identification field of a Fibre Channel frame header.

* * * * *